(12) United States Patent
Zhou (10) Patent No.: US 9,256,298 B2
(45) Date of Patent: Feb. 9, 2016

(54) DISPLAY PANEL AND OPERATION CONTROL METHOD THEREOF, AND DISPLAY DEVICE

(71) Applicant: BOE Technology Group Co., Ltd., Beijing (CN)

(72) Inventor: Weifeng Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 111 days.

(21) Appl. No.: 13/996,216

(22) PCT Filed: Dec. 17, 2012

(86) PCT No.: PCT/CN2012/086780
§ 371 (c)(1),
(2) Date: Jun. 20, 2013

(87) PCT Pub. No.: WO2013/139152
PCT Pub. Date: Sep. 26, 2013

(65) Prior Publication Data
US 2014/0125578 A1    May 8, 2014

(30) Foreign Application Priority Data

Mar. 22, 2012   (CN) .......................... 2012 1 0078599

(51) Int. Cl.
*G09G 5/00* (2006.01)
*G06F 3/03* (2006.01)
(Continued)

(52) U.S. Cl.
CPC ................ *G06F 3/03* (2013.01); *G06F 1/1652* (2013.01); *G09G 3/20* (2013.01); *G09G 2380/02* (2013.01)

(58) Field of Classification Search
None
See application file for complete search history.

(56) References Cited

U.S. PATENT DOCUMENTS

2003/0227441 A1* 12/2003 Hioki et al. ................... 345/156
2009/0219247 A1   9/2009 Watanabe et al.
(Continued)

FOREIGN PATENT DOCUMENTS

CN    102054399 A    5/2011
CN    102087824 A    6/2011
(Continued)

OTHER PUBLICATIONS

International Search Report (Chinese language) issued by the International Searching Authority, rendered Mar. 22, 2012, 14 pages.
(Continued)

*Primary Examiner* — Nicholas Lee
(74) *Attorney, Agent, or Firm* — Ladas & Parry LLP (57) ABSTRACT

A display panel, an operation control method thereof and a display device for improving users' experience of display products. Wherein the display panel comprises a flexible substrate (1) and a sensor control circuit (3) and a sensitive element (4) provided on the flexible substrate (1), the sensor control circuit (3) is connected to the sensitive element (4), and a sensitive parameter of the sensitive element (4) varies with the bending degree of the flexible substrate (1) so that a detected signal passing through the sensitive element (4) varies with the bending degree of the flexible substrate (1); the sensor control circuit (3) includes a signal generating circuit for inputting the detected signal into the sensitive element (4), and a feedback circuit for converting the detected signal passing through the sensitive element (4) into a feedback signal indicating the bending degree of the flexible substrate (1) and for sending it to a control system connected to the display panel, so that the control system performs corresponding control operations in accordance with the feedback signal.

18 Claims, 3 Drawing Sheets

(51) Int. Cl.
*G09G 3/20* (2006.01)
*G06F 1/16* (2006.01)

(56) References Cited

U.S. PATENT DOCUMENTS

| | | | |
|---|---|---|---|
| 2011/0057873 | A1 | 3/2011 | Geissler et al. |
| 2011/0095974 | A1 | 4/2011 | Moriwaki |
| 2011/0134087 | A1 | 6/2011 | Moriwaki |
| 2011/0134144 | A1 | 6/2011 | Moriwaki |
| 2011/0134145 | A1 | 6/2011 | Moriwaki |
| 2012/0038613 | A1 | 2/2012 | Choi |
| 2014/0125578 | A1 | 5/2014 | Zhou |

FOREIGN PATENT DOCUMENTS

| | | |
|---|---|---|
| CN | 102097047 A | 6/2011 |
| CN | 102097048 A | 6/2011 |
| CN | 102629446 A | 8/2012 |

OTHER PUBLICATIONS

The State Intellectual Property Office of the People's Republic of China ("SIPO") (Chinese Language) Office Action issued on Mar. 19, 2013 by SIPO in Chinese Patent Application No. 201210078599.1; seven (7) pages.
English Translation of the State Intellectual Property Office of the People's Republic of China ("SIPO") Office Action issued on Mar. 19, 2013 by SIPO in Chinese Patent Application No. 201210078599.1; two (2) pages.
The State Intellectual Property Office of the People's Republic of China ("SIPO") (Chinese Language) Office Action issued on Oct. 8, 2013 by SIPO in Chinese Patent Application No. 201210078599.1; four (4) pages.
The State Intellectual Property Office of the People's Republic of China ("SIPO") (Chinese Language) Office Action issued on Mar. 13, 2014 by SIPO in Chinese Patent Application No. 201210078599.1; five (5) pages.
English Translation of the State Intellectual Property Office of the People's Republic of China ("SIPO") Office Action issued on Mar. 13, 2014 by SIPO in Chinese Patent Application No. 201210078599.1; five (5) pages.
English abstract of CN102097047(A) listed above, 15 pages.
English abstract of CN102097048(A) listed above, 17 pages.
English abstract of CN102087824(A) listed above, 21 pages.
English abstract of CN102054399(A) listed above,16 pages.
English abstract of CN102629446(A) listed above, 24 pages.
PCT International Preliminary Report on Patentability issued by The International Bureau of WIPO on Sep. 23, 2014 for International Application No. PCT/CN2012/086780, 11 pages.

* cited by examiner

DISPLAY PANEL AND OPERATION CONTROL METHOD THEREOF, AND DISPLAY DEVICE

CROSS REFERENCE TO RELATED APPLICATIONS

This application is based on International Application No. PCT/CN2012/086780 filed on Dec. 17, 2012 which claims priority to Chinese National Application No. 201210078599.1, filed on Mar. 22, 2012, the contents of which are incorporated herein by reference.

FIELD OF THE INVENTION

Embodiments of the present invention relate to the field of display technology, in particular relate to a display panel and its operation control method, and a display device.

BACKGROUND

A flexible display panel which is made of flexible materials and thus can be bent, has become one of the most popular trends in the field of display technology, since it can meet users' higher demands for product experiences. However, in the prior art the operations on the display function of the flexible display panel (such as zoom-in and zoom-out of images, the opening and closing of programs, page flipping, etc.) are mainly performed by the user pressing control keys corresponding to the function or by the corresponding touch operation. With the development of the display technology, these operations have been unable to meet the users' demands for the product experience.

SUMMARY

Embodiments of the present invention provide a display, a display panel and its operation control method, for improving users' experience of the display product.

To achieve the above object, an embodiment of the present invention adopts the following technical solution:

According to one aspect, a display panel is provided, comprising a bendable flexible substrate, and further comprising a sensor control circuit and a sensitive element provided on the flexible substrate, the sensor control circuit being connected to the sensitive element;

a sensitive parameter of the sensitive element varies with the bending degree of the flexible substrate so that a detected signal passing through the sensitive element varies with the bending degree of the flexible substrate;

the sensor control circuit includes a signal generating circuit and a feedback circuit, wherein, the signal generating circuit is used for inputting the detected signal into the sensitive element;

the feedback circuit is used for converting the detected signal passing through the sensitive element into a feedback signal indicating the bending degree of the flexible substrate and sending it to a control system connected to the display panel, so that the control system performs corresponding control operations in accordance with the feedback signal.

According to one aspect, a display device is provided, comprising aforementioned display panel.

According to one aspect, an operation control method for controlling the aforementioned display panel is provided, wherein, the method comprises:

inputting a detected signal to the sensitive element;

converting the detected passing signal through the sensitive element into a feedback signal indicating the bending degree of the flexible substrate and sending it to a control system connected to the display panel, the control system performing a control of the corresponding functions of the display panel in accordance with the feedback signal.

The display panel and the operation control method thereof, as well as the display device provided by the embodiments of the present invention can convert a user's bending operation on a display panel into a feedback signal sent to a control system connected to the display panel, through the sensitive element and a sensor control circuit provided on the flexible substrate, therefore achieving a control over the display function. Users can achieve a control over the display function on the display panel (such as image zoom-in and zoom-out, opening and closing programs, page flipping, etc.) through a bending operation of the display panel, without pressing the function control keys set on the display panel. Users' experience is enhanced.

BRIEF DESCRIPTION OF THE DRAWINGS

In order to illustrate the technical solutions according to the embodiments of the present invention or the prior art more clearly, the accompanying drawings needed in the description of the embodiments and the prior art will be briefly introduced in the following. Obviously, the accompanying drawings in the following description illustrate only part of the embodiments of the present invention, and for an ordinary skill in the art, other accompanying drawings can also be obtained according to these ones, without making inventive efforts.

DETAILED DESCRIPTION

The technical solutions in the embodiments of the present invention will be clearly and completely described in combination with the accompanying drawings of the present invention in the following. Obviously, the described embodiments are merely part of the embodiments of the present invention, rather than the all embodiments. Based on the embodiments of the present invention, all other embodiments obtained by an ordinary skill in the art without making inventive efforts fall into the protection scope of the present invention.

Embodiment 1

An embodiment of the invention provides a display panel, comprising a bendable flexible substrate, further comprising a sensor control circuit and a sensitive element provided on the flexible substrate.

Wherein, the sensor control circuit is connected to the sensitive element.

The sensitive parameter of the sensitive element varies with the bending degree of the flexible substrate so that a detected signal passing through the sensitive element varies with the bending degree of the flexible substrate.

The sensor control circuit includes: a signal generating circuit for inputting the detected signal into the sensitive element; and a feedback circuit for converting the detected signal through the sensitive element into a feedback signal indicating the bending degree of the flexible substrate and sending it to a control system connected to the display panel so that the control system performs corresponding control operations in accordance with the feedback signal.

Wherein, the flexible substrate refers to the substrate of the display panel, such as array substrate and color film substrate of a liquid crystal panel. That is, the display panel according to the embodiment of the present invention is a flexible display panel. Being provided on the flexible substrate, included are a surface provided on the flexible substrate, and also respective layers provided within the flexible substrate, such as the data line metal layer of the array substrate, etc.

Figure 1A:
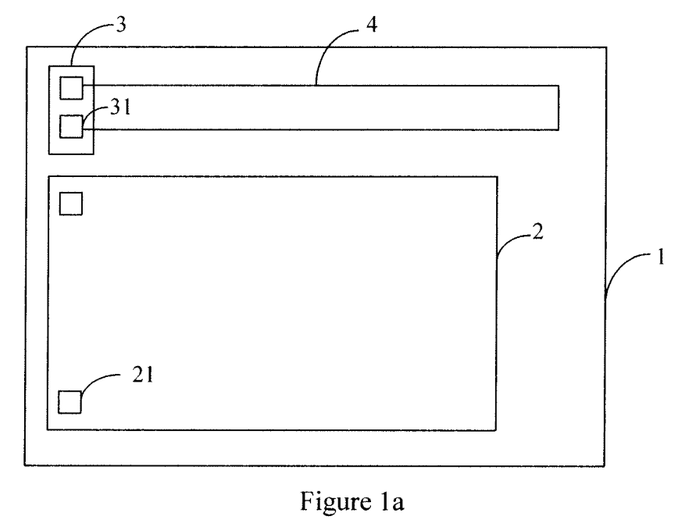
FIG. 1a is a schematic diagram of the structure of the display panel according to a first embodiment of the present invention.

Specifically, a display panel provided according to the embodiment of the present invention, as shown in FIG. 1a, includes a bendable flexible substrate 1, an electrode signal control circuit 2 provided on the flexible substrate 1, a sensor control circuit 3 and a sensitive element 4 (FIG. 1a is only for schematic purpose and does not illustrate the actual shape and configuration of the sensitive element 4). Wherein, the electrode signal control circuit 2 is provided with two first pins 21 connected to the respective electrodes (such as a pixel electrode, a common electrode, etc.), and the sensor control circuit 3 is provided with two second pins 31 respectively connected to both terminals of the sensitive element 4, in particular, one of the second pins 31 (the output pin of the sensor control circuit 3) being connected to the input of the sensitive element 4, the other of the second pins 31 (the input pin of the sensor control circuit 3) being connected to the output of the sensitive element 4. Thus, the sensor control circuit 3 inputs a detected signal into the sensitive element 4 through one of the second pin 31, and the detected signal passes through the sensitive element 4 and then returns to the sensor control circuit 3 via the other second pin 31.

The above connection relationship among the electrode signal control circuit 2, the sensor control circuit 3 and the sensitive element 4 is only a illustrative connection relationship, and the actual connection relationship is not limited to this; For instance, the sensor control circuit 3 can be provided with four second pins 31, two output pins, the other two input pins, being connected to two separate sensitive elements 4; the electrode signal control circuit 2 can also be provided with more than two first pins 21 respectively connected to electrodes such as a pixel electrode, a common electrode and a gate scanning line, etc.

Wherein, the electrode signal control circuit 2 is an essential driving circuit when the display panel displays, and its function is to provide the display panel with the working voltage or current necessary for its display. However, the electrode signal control circuit is not the design point of the present invention nor the characteristic necessary for solving the technical problem to be solved by the present invention, and the description herein is only for schematic purpose so as to facilitate description when the sensor control circuit 3 and electrode signal control circuit 2 are integrated on one chip in the subsequent embodiments, but not for limiting the various embodiments of the present invention.

The sensitive parameter of the sensitive element 4 varies with the bending degree of the flexible substrate 1, so that the detected signal passing through the sensitive element 4 will vary with the bending degree of the flexible substrate 1. The bending degree of the flexible substrate 1 can be determined according to the change of the detected signal passing through the sensitive element 4.

The sensor control circuit 3 comprises a signal generating circuit and a feedback circuit, wherein: the signal generating circuit is used for inputting the detected signal into the sensitive element 4; the feedback circuit is used for converting the detected signal passing through the sensitive element 4 into a feedback signal indicating the bending degree of the flexible substrate 1, and for sending it to a control system connected to the display panel so that the control system performs corresponding control operations in accordance with the feedback signal.

The sensitive parameters described in the embodiments of the present invention are optical-characteristic-related or electrical-characteristic-related parameters subject to change, such as resistance, capacitance, luminous flux, magnetic flux and so on. The detected signal described in the various embodiments of the present invention refers to an electrical or optical signal for detecting the change of the corresponding sensitive parameter.

It should be noted that the above sensitive element is any element having sensitive parameters that can change with the bend deformation thereof. For example, a resistance wire of which resistance value can change with the bend deformation thereof, a photovoltaic element of which luminous flux can change with the bend deformation thereof, a capacitance element of which capacitance values can change with the bend deformation thereof, and a magnetic element of which magnetic flux can change with the bend deformation thereof, etc. The above sensor control circuit corresponds to the sensitive element. For example, when the sensitive element is a resistance wire of which resistor value can change with the bend deformation thereof, the sensor control circuit is the corresponding resistance sensor control circuit; when the sensitive element is a photovoltaic element of which luminous flux can change with the bend deformation thereof, the sensor control circuit is the corresponding photoelectric sensor control circuit.

The display panel provided by the embodiment of the present invention can convert a user's bending operation on a display panel into a feedback signal sent to a control system connected to the display panel through the sensitive element and a sensor control circuit provided on the flexible substrate, therefore achieving a control over the display function. Users can achieve a control over the display function of the display panel (such as image zooming in and zooming out, opening and closing programs, page flipping, etc.) through a bending operation on the display panel, without pressing the function control keys (press control keys or touch control keys, etc.) set on the display panel, thereby enhancing the users' experience.

The embodiment of the present invention can apply to a variety of flexible display panels, such as an OLED panel, electronic paper, a LCD panel, etc.; wherein, the LCD panel may be various types of LCD (Liquid Crystal Display), for instance, a horizontal electric field LCD such as In-Plane Switching (IPS) type, the Fringe Field Switching (FFS) type and the Advanced-Super Dimensional Switching (AD-SDS) type, as well as a vertical electric field LCD such as the Twisted Nematic (TN) type.

Embodiment 2

Figure 1B:
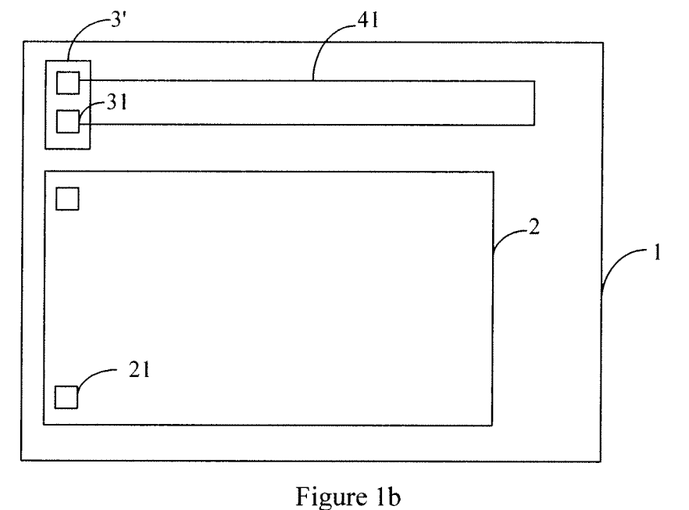
FIG. 1b is a schematic diagram of the structure of the display panel according to a second embodiment of the present invention.

On the basis of the first embodiment, the present invention provides a display panel, and it adopts a flexible liquid crystal display panel as the display panel, a resistance wire as the sensitive element, a resistance sensor control circuit as the sensor control circuit. As shown in FIG. 1b, the structure thereof is as follows:

The display panel provided by the present embodiment is a liquid crystal display panel formed by the coupling of an array substrate and a color film substrate, filled with a liquid crystal layer therebetween. The array substrate includes a base substrate having crisscrossed gate lines and data lines formed thereon, and pixel units in an array form are formed in the area formed by the crisscrossed gate lines and data lines. Wherein, each pixel unit is provided with a common electrode, a pixel electrode and a thin film transistor. Accordingly, the color film substrate comprises a base substrate as well as a black matrix and pixel resins formed on the base substrate. Of course, a common electrode can also be set on the color film substrate, and the present embodiment provides no limitation to the set position of the common electrode.

Wherein, the base substrate of the array substrate and the color film substrate is a bendable flexible substrate. In this embodiment, for the way of the electrode signal control circuit, the resistance sensor control circuit and the sensitive element being provided on the display panel, they may be provided on the array substrate, may also be provided on the color film substrate, and may be partially provided on the color film substrate while partially provided on the array substrate (for instance, the electrode signal control circuit and the resistance sensor control circuit are provided on the array substrate, and the sensitive element is provided on the color film substrate).

An example in which a resistance wire 41, an electrode signal control circuit 2 and a resistance sensor control circuit 3' are provided on the array substrate will be described in the following.

As shown in FIG. 1b, an electrode signal control circuit 2, a resistance sensor control circuit 3' and a resistance wire 41 (i.e., one type of sensitive element 4) are provided on the flexible substrate 1 of the array substrate (the color film substrate and the liquid crystal layer are not shown in the figure).

Wherein, the electrode signal control circuit 2 is provided with two first pins 21 respectively connected with the pixel electrode and the common electrode. The electrode signal control circuit 2 provides the working voltage driving the liquid crystal molecules turnover for the pixel electrode and the common electrode via the first pin 21.

Figure 2A:
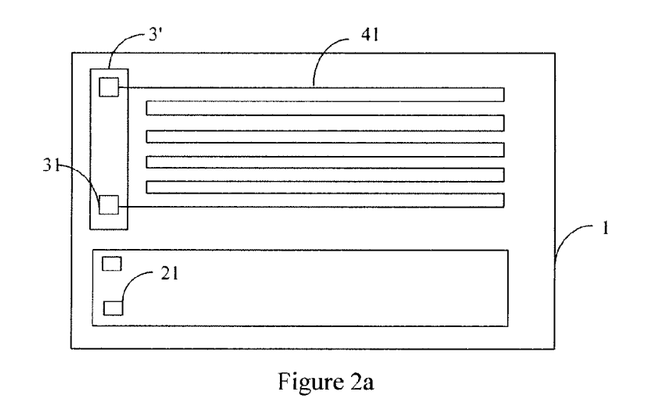
FIG. 2a~2c are schematic diagrams of the way of setting the resistance wire in the display panel according to the second embodiment of the present invention.
Figure 2B:
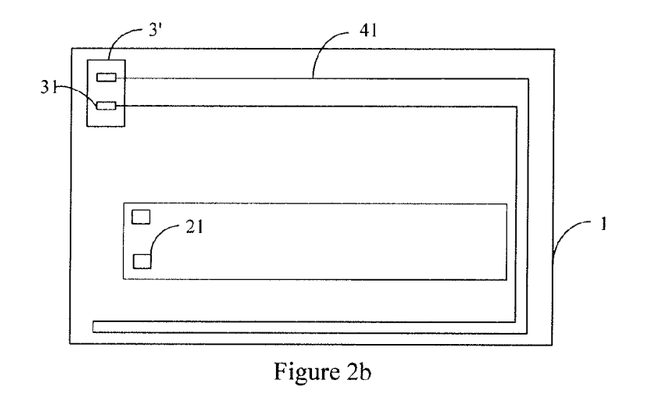
Figure 2C:
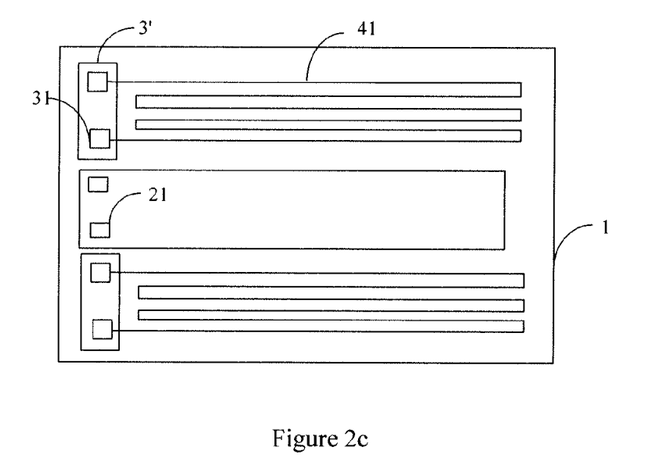

The resistance sensor control circuit 3' is provided with two second pins 31, wherein one of the second pin 31 is connected with one end of the resistance wire 41, and the resistance wire 41 can be set for at least one fold along the edge of the array substrate (refer to the edge position of the surface of the array substrate) and then connected with the other of the second pins 31. Illustratively, as shown in FIG. 2a, the resistance wire 41 is set for five folds along the edge of one side of the array substrate and then connected with the other of the second pins 31. Also as shown in FIG. 2b, the resistance wire 41 is set for one fold along the edge of the three adjacent sides of the array substrate and then connected with the other of the second pins 31. Also as shown in FIG. 2c, the resistance wire 41 is set for three folds along the edge of the two sides not adjacent of the array substrate and then connected with the other of the second pins 31. The resistance wire 41 also can be set for at least one fold along within the array substrate (refer to various non-surface layers of the array substrate, such as a data line layer, a gate line layer, etc.) and then connected with the other of the second pins 31. Illustratively, the resistance wire 41 can be set for five folds along the positions of the data lines within the array substrate at intervals of two pixels and then connected to the other of the second pins 31. The resistance wire 41 can also be set for seven folds along the positions of the gate lines within the array substrate at intervals of two pixels and then connected to the other second pin 31. Of course, the specific shape set for the resistance wire 41 can also be any geometric shapes other than the rectangular shown in the figure, and the specific number of folds set for the resistance wire 41 may be determined according to the actual situation. In this way, the resistance wire 41 will be bent with a bending of the flexible substrate 1, thus generating a deformation, and the resistance value of the resistance wire 41 varies with the change of the deformation. Accordingly, the resistance value of the resistance wire 41 will vary with the bending degree of the flexible substrate 1. In this way, the sensor control circuit 3' inputs a detected current into the resistance wire 41 through one of the second pins 31, and the detected current passes through the resistance wire 41 and then returns to the resistance sensor control circuit 3' via the other of the second pins 31. In the case of the detected voltage on both ends of the resistance wire 41 being constant, the detected current passing through the resistance wire 41 will vary with the bending degree of the flexible substrate 1. The bending degree of the flexible substrate 1 can be determined according to the change of the detected current passing through the resistance wire 41.

Wherein the resistance wire 41 and the second pin 31 of the resistance sensor control circuit 3' can be manufactured simultaneously with the lead wires and/or electrodes (such as a source/drain, a gate electrode, a data line, a common electrode, etc.) in the flexible substrate 1, and no extra process being needed. That is, the resistance wire 41 and the second pin 31 may be located on the source/drain metal layer of the array substrate, may also be located on the gate metal layer of the array substrate, may also be provided on the same layer with that of the data lines, or provided on the same layer with that of the common electrode lines; they are simultaneously formed by using metal of the corresponding layer through a patterning process. Of course, the resistance wire 41 and the second pin 31 can also be located on other layers of the array substrate, but in this case it is necessary to form an additional metal layer and this may be achieved through a patterning process or so. In the present embodiment, the resistance wire 41 and the second pin 31 can be on the same layer or different layers. Further, the resistance wire 41 may be provided on the side of the array substrate where no array is formed, may be provided on the surface of the array substrate, or may also be provided on the surface of a polarizer above the array substrate. Embodiments of the present invention place no constraint on the position of the resistance wire 41, and any variation of the above-described manner can also realize the technical solution of the present invention.

Figure 3:
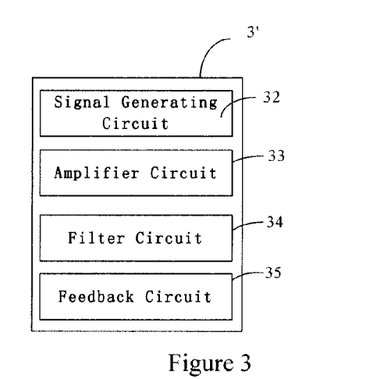
FIG. 3 is a schematic diagram of the structure of the resistance sensor in the display panel according to the second embodiment of the present invention.

In an embodiment of the present invention, a typical resistance sensor control circuit 3', as shown in FIG. 3, includes a signal generating circuit 32 for inputting the detected current into the sensitive element 4. It further comprises an amplifier circuit 33 for amplifying the detected current passing through the resistance wire 41. It further comprises a filter circuit 34 for filtering the detected current passing through the resistance wire 41. It further comprises a feedback circuit 35 for converting the detected current passing through the resistance wire 41 into a feedback signal indicating the bending degree of the flexible substrate 1 and sending it to the control system connected with the display panel, so that the control system performs corresponding control operations in accordance with the feedback signal. Wherein, the signal generating circuit 32, the amplifier circuit 33, the filter circuit 34 and the feedback circuit 35 are sequentially connected to realize the process of generation, amplification, filtering and feedback of the detected signal (detected current). Of course, the structure of the resistance sensor control circuit 3' is not limited thereto, and can also be implemented in other forms of circuit. For instance, the filter circuit 34 and the amplifier circuit 33 may be transposed, i.e. first the filter processing is performed, then the signal amplification is performed. As another example, in certain circumstances, the resistance sensor control circuit 3' does not include the filter circuit 34 (for example, in the case where the interference signal in the detected current does not affect the control result), or does not include the amplifier circuit 33 (for example, in the case where the detected current can be detected without amplification). The sensor control circuit according to other embodiments of the present invention may also adopt a structure similar to that of the above-mentioned resistance sensor control circuit 3'.

Embodiment 3

Figure 4:
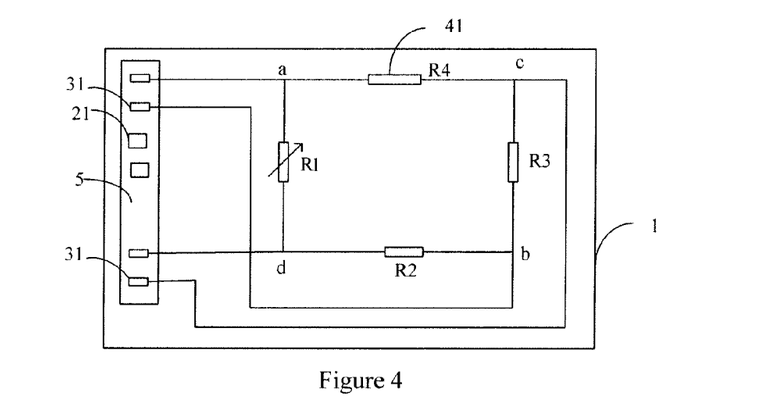
FIG. 4 is a schematic diagram of the structure of the display panel according to a third embodiment of the present invention.

The present embodiment provides a display panel as shown in FIG. 4, the difference between it and the display panel provided by the embodiment 1 and embodiment 2 is that the electrode signal control circuit 2 and the sensor control circuit 3 (resistance sensor control circuit 3') are integrated on the same integrated circuit 5. That is, a sensor control circuit can be integrated into an integrated circuit with a conventional electrode signal control circuit, thereby helping to reduce costs.

Taking a liquid crystal panel as described in the second embodiment for example, in the present embodiment, two first pins 21 are provided at the positions corresponding to the electrode signal control circuit 2 in the integrated circuit 5, and the electrode signal control circuit 2 provides the working voltage driving the liquid crystal molecules turnover for the pixel electrode and the common electrode via the first pin 21. Four second pins 31 are provided at the positions corresponding to the resistance sensor control circuit 3' in the integrated circuit 5. Here is only an illustrative structure, and changes can be made according to the actual design and the actual IC.

In addition, the flexible substrate 1 thereon is provided with a resistance wire 41 (its resistance value is referred to as R4), a variable resistor R1 and two fixed resistors R2, R3. The four resistors are connected into a Wheatstone bridge. Illustratively, as shown in FIG. 4, the resistors R1, R2, R3 and the resistance wire 41 are connected into a rectangular, and then the two endpoints a, b are respectively connected with the two second pins 31 at the upper end of the integrated circuit 5, inputting the detected signal into the respective resistors in the Wheatstone bridge through the two second pins 31 at the upper end. The two endpoints c, d are respectively connected with the two second pins 31 at the lower end of the integrated circuit 5, and in the resistance sensor control circuit 3', a galvanometer is provided as being connected to the two second pins 31 at the lower end of the integrated circuit 5 (not shown in FIG. 4). In the detecting process, when there is current passing through the galvanometer, i.e., when the bridge is unbalanced, the variable resistor R1 is adjusted until the bridge reaches balance. In this way, the effects of the resistance value generated in the process on the detected current can be removed, thus improving the detection accuracy. Four resistance wires 41 can also be provided at different positions on the flexible substrate 1, and the aforesaid four resistance wires 41 are connected into a Wheatstone bridge in the manner as shown in FIG. 4. The difference is that the galvanometer in FIG. 4 is replaced by an ampermeter. When the display panel is laid flat, i.e. the display panel is not bent, the resistance values of the four resistor wires 41 can meet the requirements for the bridge balance, i.e. there is no current passing through the ampermeter in the resistance sensor control circuit 3'. When the display panel is bent, the ampermeter in the resistance sensor control circuit 3' displays the current value. After passing through the amplifier circuit 33 and the filter circuit 34 in the resistance sensor control circuit 3', the current is converted into a feedback signal indicating the bending degree of the display panel 1 via the feedback circuit 35 and then sent to a control system connected to the display panel, so that the control system performs corresponding control operations in accordance with the feedback signal.

It is noted that the galvanometer in FIG. 4 can also be provided in other structures other than the flexible substrate 1 of the array substrate, such as the flexible substrate 1 of a color film substrate. The galvanometer in the present embodiment can also be replaced by an ampermeter. Further, the specific structure of the resistance wire 41 in the embodiment of the present invention can also be applied to other embodiments.

Embodiment 4

The difference between the display panel provided by the present embodiment and the display panel provided by the embodiment 1 and embodiment 2 is that the sensor control circuit 3 or the resistance sensor control circuit 3' is stuck directly on the surface of the flexible substrate 1 by using adhesive materials such as a tape. In this way, the manufacturing process of the display panel can be simplified.

It is noted that the structures of display panel according to the embodiment 2 and the embodiment 3 of the present invention are described by way of taking the liquid crystal panel for example, but they also apply to other types of display panels, such as the OLED panel, the electronic paper panel and so on. When they apply to other types of display panels, the arrangement and position relationship of the relevant parts can be correspondingly adjusted according to characteristics of this type of display panel.

Embodiment 5

An embodiment of the invention further provides a display device, comprising any display panel according to the above-described embodiments 1-4. The display panel may be a LCD panel, an electronic paper, an OLED panel and so on; the display device may be a LCD TV, a LCD monitor, a digital photo frame, a mobile phone and a tablet computer, and any products with a display function.

Embodiment 6

Figure 5:
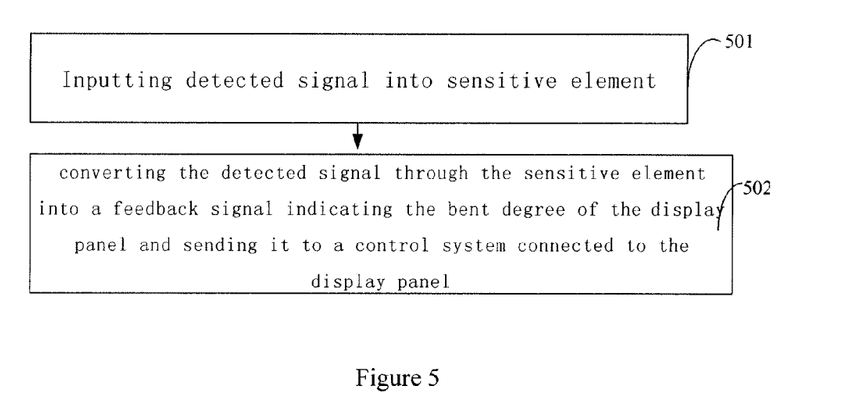
FIG. 5 is a flow chart of the control method of the operation functions of the display panel according to a sixth embodiment of the present invention.

The embodiment of the invention also provides an operation control method of the functions of a display panel for realizing an operation control over the functions of the display panel according to the above-described embodiments 1-4. As shown in FIG. 5, the method comprising,

501: inputting a detected signal to a sensitive element.

Illustratively, it corresponds to the display panel according to the embodiment 2. This step comprises the signal generating circuit 31 in the resistance sensor control circuit 3' inputting a detected current into the resistance wire 41.

502: sending a feedback signal converted from the detected signal passing through the sensitive element and indicating the bending degree of the display panel 1 to a control system connected to the display panel.

Illustratively, it corresponds to the display panel according to the embodiment 2. This step comprises the feedback circuit 35 in the sensor control circuit 3 converting the detected current passing through the resistance wire 41 into a feedback signal indicating the bending degree of the display panel.

Specifically, the feedback signal is a digital signal. A feedback threshold value of the detected current can be predetermined based on the relationship between the resistance value of the resistance wire 41 and its deformation change. In each of the predetermined time period T, the detected current passing through the resistance wire 41 is compared to the feedback threshold value, and according to the comparison result the detected current within the time T is converted into a corresponding digital signal. Thus, in the continuous time period T, the feedback circuit 35 feeds back a digital signal sequence to a control system connected to the display panel (such as Windows operating system) by performing the above operation for the detected current passing through the resistance wire 41, and the control system achieves an operation control over the functions of the display panel (such as image zooming in and zooming out, opening and closing programs, page flipping, power on/off) according to the digital signal sequence.

It should be noted that the feedback threshold value can be one value, then when the detected current passing through the resistance wire 41 is greater than the feedback threshold value, the feedback circuit 35 outputs a first feedback value, such as a digit 0. When the detected current passing through the resistance wire 41 is less than the feedback threshold value, the feedback circuit 35 outputs a second feedback value, such as a digit 1. Thus, in the continuous time period T, the feedback circuit 35 feeds back a digital signal sequence composed of 0 and 1 to a control system connected to the display panel by performing the above operation for the detected current passing through the resistance wire 41. The aforesaid feedback threshold value can also be a plurality of values. If the aforesaid feedback threshold value includes two values—a first feedback threshold value and a second feedback threshold value, and the first feedback threshold value is smaller than the second feedback threshold value, when the detected current passing through the resistance wire 41 is less than the first feedback threshold value, the feedback circuit 35 outputs a first feedback value, such as a digit 0. When the detected current passing through the resistance wire 41 is greater than the first feedback threshold value and less than the second feedback threshold value, the feedback circuit 35 outputs a second feedback value, such as a digit 1. When the detected current passing through the resistance wire 41 is greater than the second feedback threshold value, the feedback circuit 35 outputs a third feedback value, such as a digit 2. Thus, in the continuous time period T, the feedback circuit 35 feeds back a digital signal sequence composed of 0, 1 and 2 to a control system connected to the display panel by performing the above operation for the detected current passing through the resistance wire 41. In this way, the control operations of the control system on the functions of the display panel can be made more accurate.

In the following, the specific process of step 502 will be illustrated by a specific example.

Assuming that when the display panel is not bent, i.e. no bending deformation occurs, the resistance value of the resistance wire 41 is 10 kΩ, and a 5V constant voltage is applied to two ends of the resistance wire 41 by the signal generating circuit 32, the detected current passing through the resistance wire 41 is 0.5 mA. When the display panel is applied with an external force, such as by about 10 N tensile stress, a bending deformation comes to the resistance wire 41, causing its resistance value increased by $1.4 \times 10^{-4}$ Ω, which makes the detected current passing through the resistance wire reduced by 7 pA, and then 0.5 mA−7 pA=0.493 mA is set to be the first feedback threshold point. 0.5 mA−7×2 pA=0.486 mA is set to be the second feedback threshold point. The time period T is set to be 1 second, and the detected current passing through the resistance wire 41 will be compared with the first and second feedback threshold points every one second by the feedback circuit 35. When the detected current passing through the resistance wire 41 is less than 0.486 mA, the feedback circuit 35 outputs the digital signal 0. When the detected current through the resistance wire 41 is greater than 0.486 mA and less than 0.493 mA, the feedback circuit 35 outputs the digital signal 1. When the detected current passing through the resistance wire 41 is greater than 0.493 mA, the feedback circuit 35 outputs the digital signal 2. Thus, in the continuous time period T, the feedback circuit 35 feeds back a digital signal sequence composed of 0, 1 and 2 to a control system connected to the display panel by performing the above operation for the detected current passing through the resistance wire 41. Further, the control system achieves a control over the display panel in accordance with the digital signal sequence, performing operations of such functions as image zooming in and zooming out, opening and closing program, page flipping, etc.

The aforementioned are only detailed implementations of the present invention, however, the protection scope of the present invention is not limited thereto. Any modification or replacement within the technical scope disclosed in the present disclosure easily conceived by those skilled in the art should be considered as falling into the protection scope of the present disclosure. Therefore, the scope sought for protection in the present disclosure should be subject to the scope sought for protection in the claims.

What is claimed is:

1. A display panel comprising a bendable flexible substrate, and further comprising a sensor control circuit and a sensitive element provided on the flexible substrate, the sensor control circuit being connected to the sensitive element;
    a sensitive parameter of the sensitive element varies with a bending degree of the flexible substrate so that a detected signal passing through the sensitive element varies with the bending degree of the flexible substrate;
    the sensor control circuit including a signal generating circuit and a feedback circuit,
    wherein,
    the signal generating is used for inputting the detected signal into the sensitive element;
    the feedback circuit is used for converting the detected signal passing through the sensitive element into a feedback signal indicating the bending degree of the flexible substrate and for sending it to a control system connected to the display panel, so that the control system performs corresponding control operations in accordance with the feedback signal,
    wherein, at least two second pins are provided on the sensor control circuit, and the two pins are respectively connected to two terminals of the sensitive element.

2. The display panel according to claim 1, wherein, one terminal of the sensitive element is connected with one of the second pins, and the sensitive element is set for at least one fold along the edge of the display panel and then connected with the other of the second pins; or
    one terminal of the sensitive element is connected with one of the second pins, and the sensitive element is set for at least one fold within the display panel and then connected with the other of the second pins.

3. The display panel according to claim 1, wherein, the electrode signal control circuit and the sensor control circuit are integrated on a same integrated circuit, and the integrated circuit thereon is provided with the first pin and at least two second pins.

4. The display panel according to claim 1, wherein, the sensor control circuit is stuck on a surface of the flexible substrate.

5. The display panel according to claim 1, wherein, the sensitive element, together with at least two fixed resistors and at least one variable resistor, compose a Wheatstone bridge and then are connected to the second pin; or
    at least four sensitive elements are included, and the sensitive elements compose a Wheatstone bridge and then are connected to the second pin.

6. The display panel according to claim 1, wherein, the sensor control circuit further comprises:
    an amplifier circuit for amplifying the detected signal passing through the sensitive element; and/or
    a filter circuit for performing a filtering process on the detected signal passing through the sensitive element.

7. The display panel according to claim 1, wherein, the sensitive element is a resistance wire, the detected signal is a current signal, and the sensor control circuit is a resistance sensor control circuit.

8. The display panel according to claim 7, wherein, the display panel is a liquid crystal panel, and the sensitive element is provided on one side of the array substrate of the liquid crystal panel where no array pattern is formed; or
    the sensitive element is provided on a gate metal layer of the array substrate of the liquid crystal panel, and is the same material as the gate metal layer; or
    the sensitive element is provided on a data line metal layer of the array substrate of the liquid crystal panel, and is the same material as the data line; or
    the sensitive element is provided on a source/drain metal layer of the array substrate of the liquid crystal panel, and is the same material as the source/drain metal layer.

9. A display device comprising the display panel, the display panel comprises a bendable flexible substrate, and further comprising a sensor control circuit and a sensitive element provided on the flexible substrate, the sensor control circuit being connected to the sensitive element;
    a sensitive parameter of the sensitive element varies with a bending degree of the flexible substrate so that a detected signal passing through the sensitive element vanes with the bending degree of the flexible substrate;
    the sensor control circuit including a signal generating circuit and a feedback circuit,
    wherein,
    the signal generating circuit is used for inputting the detected signal into the sensitive element;
    the feedback circuit is used for converting the detected signal passing through the sensitive element into a feedback signal indicating the bending degree of the flexible substrate and for sending it to a control system connected to the display panel, so that the control system performs corresponding control operations in accordance with the feedback signal,
    where, at least two second pins are provided on the sensor control circuit, and the two pins are respectively connected to two terminals of the sensitive element.

10. An operation control method for controlling the display panel comprising:
    inputting a detected signal to a sensitive element;
    converting the detected signal passing through the sensitive element into a feedback signal indicating a bending degree of the flexible display screen and sending it to a control system connected to the display panel, performing a control over corresponding functions of the display panel in accordance with the feedback signal,
    wherein the display panel comprises a bendable flexible substrate, and further comprises a sensor control circuit and a sensitive element provided on the flexible substrate, the sensor control circuit being connected to the sensitive element;
    a sensitive parameter of the sensitive element varies with the bending degree of the flexible substrate so that a detected signal passing through the sensitive element varies with the bending degree of the flexible substrate;
    the sensor control circuit includes a signal generating circuit and a feedback circuit,
    wherein,
    the signal generating circuit is used for inputting the detected signal into the sensitive element;
    the feedback circuit is used for converting the detected signal passing through the sensitive element into a feedback signal indicating the bending degree of the flexible substrate and for sending it to a control system connected to the display panel, so that the control system performs corresponding control operations in accordance with the feedback signal,
    wherein, at least two second pins are provided on the sensor control, and the two pins are respectively connected to two terminals of the sensitive element.

11. The method according to claim 10, wherein, the feedback signal is a digital signal, and the step of converting the detected signal passing through the sensitive element into a feedback signal indicating the bending degree of the flexible display screen and sending it to a control system connected to the display panel comprising,
    in a predetermined time period, comparing the detected signal passing through the sensitive element to at least one predetermined feedback threshold values, converting the detected signal passing through the sensitive element into a digital signal according to the comparison result, and sending it to the control system.

12. The method according to claim 1, wherein, the corresponding functions comprise power on and off, zooming in and zooming out of images, opening and closing programs, or page flipping.

13. The display panel according to claim 1, wherein, the sensitive element is a resistance wire, the detected signal is a current signal, and the sensor control circuit is a resistance sensor control circuit.

14. The display panel according to claim 2, wherein, the sensitive element is a resistance wire, the detected signal is a current signal, and the sensor control circuit is a resistance sensor control circuit.

15. The display device according to claim 9, wherein, one terminal of the sensitive element is connected with one of the second pins, and the sensitive element is set for at least one fold along the edge of the display panel and then connected with the other of the second pins; or
    one terminal of the sensitive element is connected with one of the second pins, and the sensitive element is set for at least one fold within the display panel and then connected with the other of the second pins.

16. The display device according to claim 9, wherein, the electrode signal control circuit and the sensor control circuit are integrated on a same integrated circuit, and the integrated circuit thereon is provided with the first pin and at least two second pins.

17. The display device according to claim 9, wherein, the sensor control circuit is stuck on a surface of the flexible substrate.

18. The display device according to claim 9, wherein, the sensitive element, together with at least two fixed resistors and at least one variable resistor, compose a Wheatstone bridge and then are connected to the second pin; or at least four sensitive elements are included, and the sensitive elements compose a Wheatstone bridge and then are connected to the second pin.

* * * * *